United States Patent Office 2,852,812
Patented Sept. 23, 1958

2,852,812

MANUFACTURE OF ARTIFICIAL SAUSAGE CASINGS

Emil Braun, Weinheim an der Bergstrasse, Germany, assignor to Carl Freudenberg, Kommanditgesellschaft auf Aktien, Weinheim, Germany No Drawing. Application March 24, 1955
Serial No. 496,603

Claims priority, application Germany April 14, 1954

3 Claims. (Cl. 18—57)

The invention relates to the manufacture of artificial sausage casings.

Such casings are made to an increasing extent from suitable animal sources, preferably animal hides and skins. The general procedure consists in forming collagenous starting material, for instance pieces of hide or skin, into a swollen fibrous mass and extruding said mass through annular nozzles. For this purpose, such pieces of suitable size are treated with swelling agents, the swollen pieces are shredded, and the obtained fibrous mass is brought into the desired tubular form. The swelling treatment may consist first in an alkaline treatment where the material is placed in a lime solution and brought to a pH of about 13; the material is then washed so as to lower the pH to about 8, and is subsequently subjected to an acid treatment, preferably with dilute acid, which adjusts the pH to about 2.5 to 4.0. The shredding of the obtained greatly swollen hide pieces may be carried out, for instance, by squashing it between fluted rollers and by forcing the squashed material, preferably repeatedly, through perforated sieves having holes of, for instance, 1.5 and 1 mm. diameter. The obtained swollen fibrous mass is then dried to a dry content suitable for the manufacture of sausage casings, which is about 8 to 11 percent; said mass is then extruded through annular nozzles under such conditions that on passing the annular space of the nozzle it receives the desired annular form and that revolving parts of the nozzle produce a partial displacement of the fibers so as to arrange the fibers in intercrossing directions.

The tubing leaving the annular passage of the nozzle must then be dried and hardened or cured. These operations are generally carried out in such a manner that the extruded tube is inflated by air and is passed in the inflated state through a drying channel, which is heated, for instance by a current of hot air. The casing may then be cured by liquids or gases of the type used for the conventional curing of sausages.

According to another method, artificial sausage casings are made without converting the starting material into the swollen state prior to shredding. In this procedure, the starting material is first shredded and subsequently swollen, preferably by adjusting an aqueous suspension of the shredded fibrous mass to a pH of about 2.5 to 4, for instance with hydrochloric acid. The swollen fibrous mass is then processed in the same manner as set forth hereinabove by forcing the mass through annular nozzles and drying and curing the obtained fibrous tubing.

In the described manufacture of casings, considerable difficulty has been experienced in the curing step. Generally, a repeated spraying or wetting of the casings with aqueous wood smoke condensate is necessary, whereby each wetting operation must be followed by a drying procedure. Therefore, the casings must be conveyed through drying chambers of considerable length.

A principal object of the present invention is to provide an improved method for hardening sausage casings prepared from collagenous materials.

Other objects and advantages will be apparent from a consideration of the specification and claims.

According to the invention, artificial sausage casings prepared from collagenous materials, preferably animal hides or skins, are hardened by incorporating a hardening agent into the swollen fibrous mass prior to the forming thereof. As tanning or hardening agents, I use an aqueous solution of dialdehydes or diketones, preferably glyoxal. A suitable amount is about .5 to 1.5 percent of glyoxal incorporated in the fibrous mass, calculated by weight of the dry content of said mass.

As set forth hereinabove, the swollen fibrous mass is processed almost exclusively in the acid phase (pH of about 2.5 to 4.0). It is surprising and quite unexpected that the glyoxal exerts its hardening action also in said acid conditions, and that the physical and colloido-chemical properties of the acid swollen fibrous mass are in no way harmfully affected by the addition of glyoxal.

In order to bring out the hardening effect of the glyoxal, it is necessary to subject the fibrous tubing to a heat treatment. Such heat treatment takes place already in the above-mentioned drying of the wet tubing leaving the annular nozzle, whereby the tubing is usually passed in the inflated state through a drying channel. Generally, however, I prefer to subject the dried tubing to an after-heating treatment, after the air contained inside the tubing has been expelled. A suitable procedure consists, for instance, in winding lengths of the dried tubing in a coil and subjecting said coils again to a heat treatment. The heating time is a function of the temperature. At a temperature of 65° C., which generally may be considered the minimum temperature, the heating time is about 6 to 10 hours; on heating to 80° C., a heating time of about 2 hours is sufficient, at 100° C. half an hour, and at 120° C. the required heating time is only about 10 minutes. By such heat treatment, the artificial casing acquires an entirely sufficient water resistance, and its water receptivity is generally only about 100 to at most about 140 percent.

The following example is given to illustrate the process of the invention, and it is to be understood that the invention is not limited to the procedural details disclosed therein.

Example 100 kg. of glue stock splits, from which grained portions and fat containing pieces have been sorted out, are placed in a suspension of 5 kg. of burnt lime in 100 l. of water. After 4 weeks, the glue stock is rinsed with sufficient water to remove the major part of the burnt lime and placed in a solution of 10 l. of concentrated hydrochloric acid (33%) in 200 l. of water. After eight hours the hydrochloric acid has completely penetrated the skin pieces and converted the lime to calcium chloride. The acid is then removed, and the skin pieces are placed into pure water. By repeated change of the water, the wash water has finally a pH of 3.2. At this time, the skin pieces have become strongly swollen and transparent; they are divided into pieces of about nut size and brought between a pair of fluted rollers, wherein they are flattened and shredded. A plastic kneadable dough is obtained, which for further homogenization and disintegration is forced twice through perforated plates having holes of 1.5 and 1 mm. In this way, there are obtained 150 kg. of a plastic kneadable fibrous mass having a collagen content of about 12 percent. A solution of 135 g. of glyoxal in 15 l. of water is added to said mass, and the mixture is kneaded for one hour until the glyoxal is homogeneously distributed therein.

The thus obtained fibrous paste is then formed into a tubing, preferably by the method described in Patent No. 2,114,220, and subsequently dried. The dried tubing has a wall thickness of 0.065 mm. and is heated for two hours at 85° C. After said heating time, a test with fuchsine sulfurous acid for glyoxal is negative. When soaked in water, the tubing absorbs only 90 percent by weight of water. It withstands all stresses to which it is subjected when used as a sausage casing.

I claim:

1. In a method of forming artificial sausage casings by extruding a swollen plastic fibrous collagenous mass having a dry content of only about 8 to 11 percent through annular nozzles, the steps of incorporating into said mass, prior to extrusion, glyoxal in aqueous solution in an amount of 0.5 to 1.5 percent by weight, based on the dry content of said mass, which amount of glyoxal does not affect the colloidal properties of the mass prior to, and during, said extrusion, and subjecting the extruded casing to a heat treatment at a temperature of about 65 to 120° C. for a time sufficient to produce the hardening effect of the glyoxal.

2. A method of forming artificial sausage casings comprising converting collagenous material into a plastic fibrous mass having a dry content of only about 8 to 11 percent, adjusting the pH of said mass to a pH of about 2.5 to 4, adding to said mass glyoxal in aqueous solution in an amount of about 0.5 to 1.5 percent by weight of the dry content of said mass, which amount of glyoxal does not affect the collagen of said mass prior to the subsequent drying and heating steps forming said mass into tubing, inflating said tubing with air, drying said tubing, removing said inflating air, and heating said dried tubing to temperatures of about 65 to 120° C. for a time sufficient to produce substantially complete reaction of said glyoxal with said collagenous material, thereby hardening said tubing.

3. A method of forming artificial sausage casings comprising converting collagenous material into a plastic fibrous mass having a dry content of only about 8 to 11 percent, adjusting the pH of said mass to a pH of about 2.5 to 4, adding to said mass glyoxal in aqueous solution in an amount of about 0.5 to 1.5 percent by weight of the dry content of said mass, which amount of glyoxal does not affect the collagen of said mass prior to the subsequent drying and heating steps forming said mass into tubing, inflating said tubing with air, drying said mass into tubing, inflating said tubing with air, drying said tubing, deflating said dried tubing, winding said tubing to a coil, and heating said coil to a temperature of about 65 to 120° C. for a period of time of about 10 minutes to 10 hours, the shorter heating times corresponding to the higher temperatures.

References Cited in the file of this patent

UNITED STATES PATENTS

| 2,063,351 | Staud et al. | Dec. 8, 1936 |
| 2,156,929 | Swallen | May 2, 1939 |
| 2,478,248 | Croston et al. | Aug. 9, 1949 |
| 2,519,978 | Press | Aug. 22, 1950 |
| 2,524,042 | Croston et al. | Oct. 3, 1950 |
| 2,570,443 | Hall | Oct. 9, 1951 |
| 2,576,576 | Cresswell et al. | Nov. 27, 1951 |

FOREIGN PATENTS

| 892,855 | Germany | Oct. 12, 1953 |
| 471,566 | Great Britain | Sept. 7, 1937 |